Nov. 21, 1961 K. W. SCOTT 3,009,257
INTEGRATED SQUEEGEE-AIR DRYER
Filed Nov. 9, 1960 3 Sheets-Sheet 3

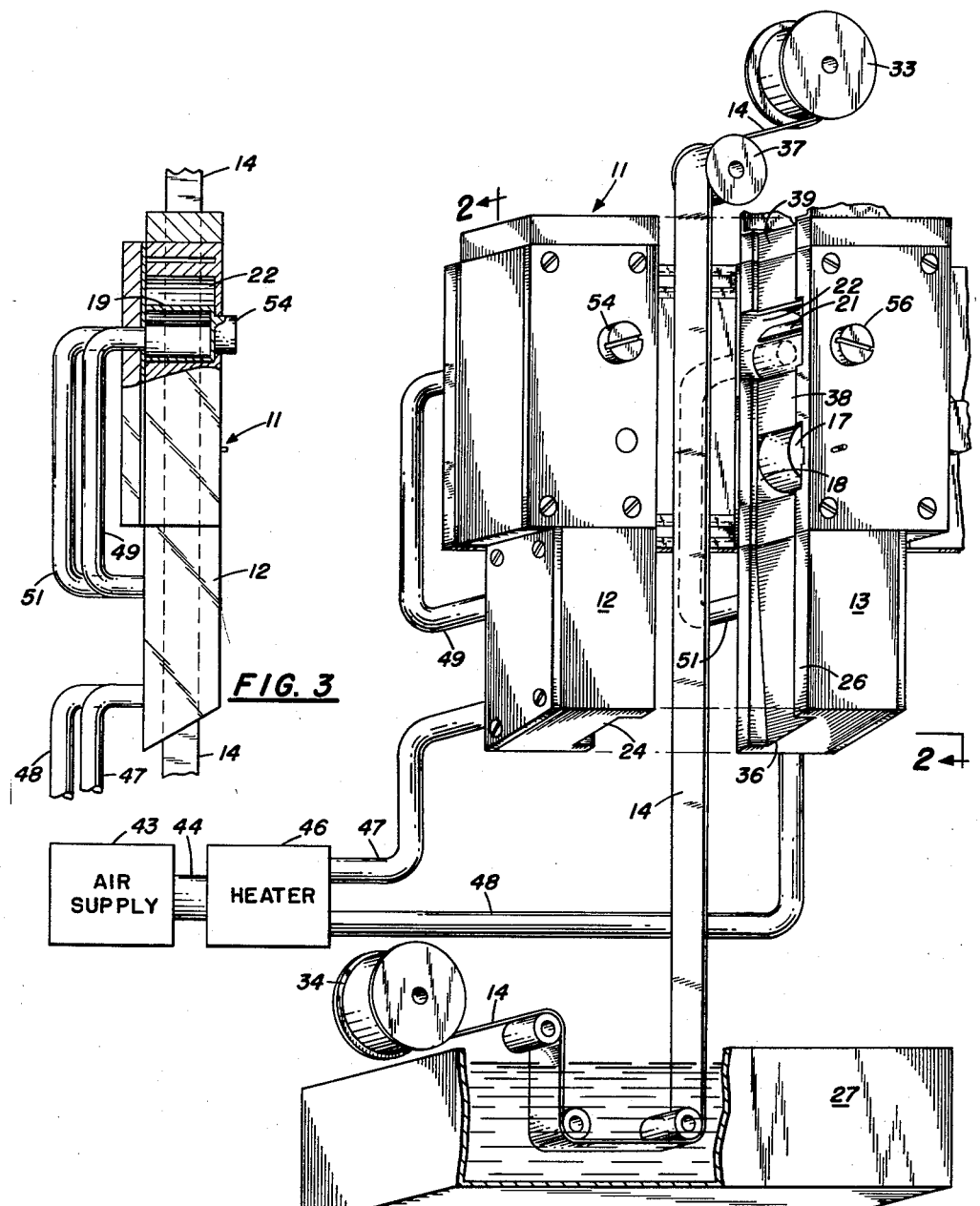

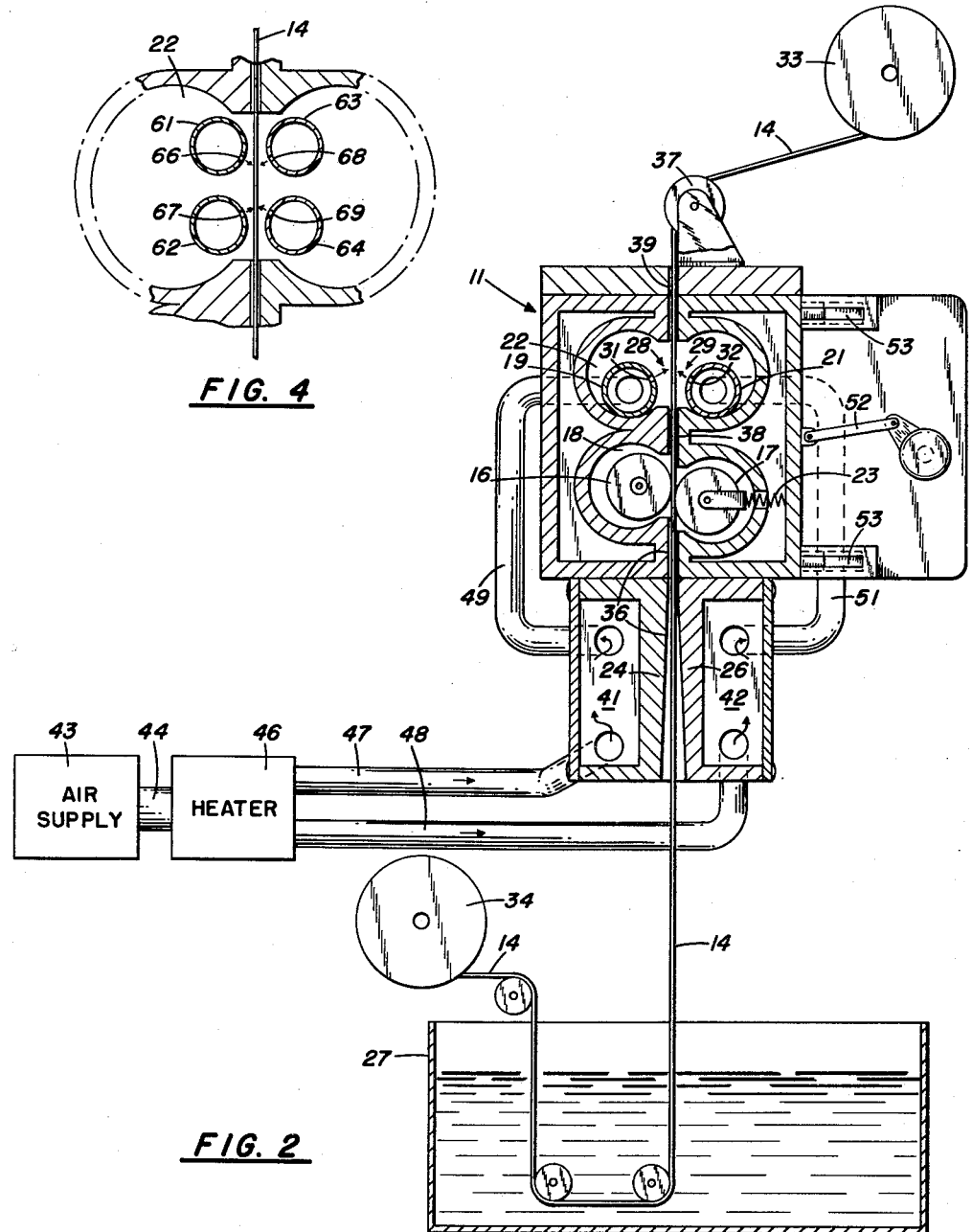

INVENTOR
KENNETH W. SCOTT

BY
ATTORNEYS

United States Patent Office 3,009,257
Patented Nov. 21, 1961

3,009,257
INTEGRATED SQUEEGEE-AIR DRYER
Kenneth W. Scott, 640 Country Club Lane,
Coronado, Calif.
Filed Nov. 9, 1960, Ser. No. 68,318
12 Claims. (Cl. 34—71)
(Granted under Title 35, U.S. Code (1952), sec. 266)

The invention described herein may be manufactured and used by or for the Government of the United States of America for governmental purposes without the payment of any royalties thereon or therefor.

The present invention relates to air squeegees and more particularly to an integrated unit including an air squeegee for drying strip material such as motion picture film after it emerges from a bath.

The present invention is particularly adapted for use in conjunction with equipment, such as an ultrasonic film cleaner, for cleaning motion picture film and magnetic tape. However, the invention is not limited to such use and can be used to dry the surfaces of a continuous web of any material where such material has been passed through a liquid.

In the case of ultrasonic cleaning the strip film is transported through ultrasonically activated cleaning and rinsing areas in a bath of solvent such as trichloro-ethylene, stabilized methyl chloroform or similar material. As the film is drawn from the cleaning tank it is coated with solvent and although the cleaning solution employed vaporizes very rapidly and could be removed from the film by evaporation such an approach poses certain additional problems. Thus, if the solvent were simply to be evaporated from the film surface the soils entrained therein would be re-deposited on the film as an adherent, streaky scum. It is therefore desirable to remove the solvent from the film while the solvent is still in its liquid state before any evaporation can occur at the film surface. In this way the removal of dissolved soil material can be assured. An attempt has been made in some prior art devices to solve this problem by drawing the strip film through an air squeegee in which opposing jets of heated air are directed against the film but in a direction opposite to the direction of travel of the film. By using high momentum air flow from the jets, the solvent is torn loose from the wet film as a fine spray. This approach, however, has the definite disadvantage that due to the great turbulence created by this method not only does the fine spray volatilize quickly but in some devices the zone of turbulence extends far enough below the inlet to the film dryer to agitate the surface of the solution in the cleaning tank producing volatilization in this region as well.

This turbulence, since it results in greater evaporation of the expensive, highly volatile solvent poses a second problem, that of the high cost of operation. The solution to this problem lies in removing the greatest part of the solvent from the film while such solvent remains in the liquid state, maintaining this solvent in the liquid state and returning it to the cleaning tank. In order to apply this procedure to a dryer incorporating an air squeegee, however, means must be employed either to prevent the turbulence generally accompaning the use of air jets or at least to localize the zone of turbulence so that a minimum amount of solvent is vaporized. Thus, to accomplish this end in the present integrated device the greatest portion of the solvent is removed from the film in the liquid state by mechanical means near the inlet thereto and returned directly to the cleaning tank while the small amount of solvent remaining on the film is removed during the final drying operation in the air squeegee. This final drying step is accomplished by using opposing jets of heated air directed against the film but at an angle slanted in the same direction as the direction of film travel. In this manner any turbulence created is directed away from the inlet of the device where the bulk of the solvent is mechanically removed. Further, means are provided for conducting this drying operation under pressure slightly in excess of atmospheric. This increased pressure acts to reduce the rate of evaporation of the solvent from the film thereby enabling the air jets to remove the solvent remaining on the film while the solvent remains in the liquid state.

Still an added problem is that of condensation of the water present as a vapor in the warm air ejected by the air squeegee and in the atmosphere. In prior art dryers employing air jets, as the jets whisk the solvent from the film the volatile solvent quickly evaporates. In the process of evaporation heat is withdrawn from the air about the evaporating solvent and the water vapor normally present in the squeegee air and in the atmospheric air is thereby condensed on the closest cool surface. This condensed water vapor then returns to the tank with any solvent that may be recirculated. Even though only a small amount of water may be added to the cleaning solvent in this manner water softens the film emulsion to such a degree that when the tape exits from the dryer and is wound upon the takeup reel, the film sticks together where the emulsion has been softened often causing irreparable damage. To cure this problem the present device includes an integral heat-exchanger designed to supply sufficient heat to offset the thermal loss due to any small amount of solvent evaporation and thereby to retain in its vapor state any water present in the air from the squeegee jets.

Therefore, an object of the present invention is the provision of a device for quickly and economically drying strip material passed therethrough.

Another object is to provide a device embodying dual means for removing volatile fluid from the surface of a web of material, the fluid remaining in the liquid state whereby first means remove the greater part of such fluid and air ejection means complete the drying operation without condensation of the water vapor in the jets of drying air.

A further object of the present invention is the provision of an integrated device combining air ejection means, wiper rollers and a heat exchanger all coacting to remove volatile fluid from the surface of a web of material with a minimum of turbulence to assure the recollection and reuse of this fluid.

Still another object is to provide an air squeegee dryer for use in connection with equipment for cleaning delicate strip material such as motion picture film, magnetic tape or the like to remove volatile solvent therefrom in an efficient, economical manner, returning the solvent so removed to the cleaning tank substantially free of water content and thereby drying the strip material without damaging the surface thereof.

Other objects and many of the attendant advantages of this invention will be readily appreciated as the same become better understood by reference to the following detailed description when considered in connection with the accompanying drawings wherein:

FIG. 1 is an isometric view of a preferred embodiment of the present invention shown with its halves separated along the center line of the device preparatory to inserting the strip of film therein;

FIG. 2 is a sectional view taken on plane 2—2 of FIG. 1 with the halves of the device in closed position and the strip film threaded therein and the balance of the film cleaning equipment shown schematically;

FIG. 3 is a side elevation of the preferred embodiment shown in isometric in FIG. 1 with a portion thereof cutaway;

FIG. 4 is a sectional view of the drying chamber showing an alternate arrangement of air jets;

Figure 5:
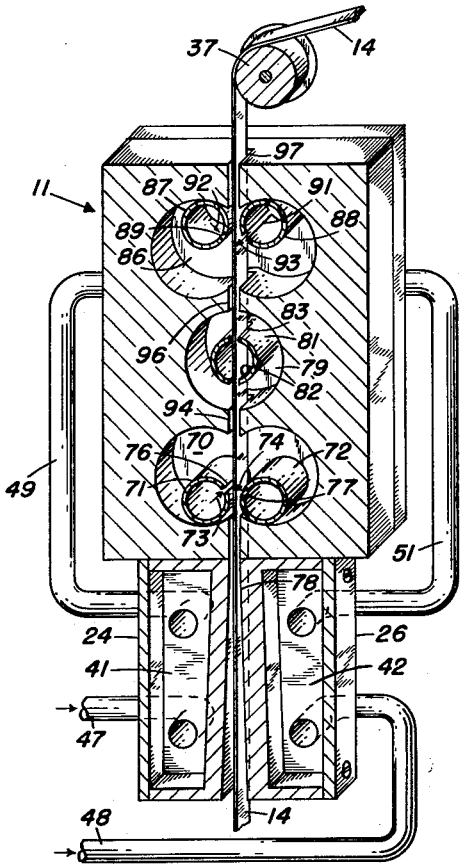
Figure 6:
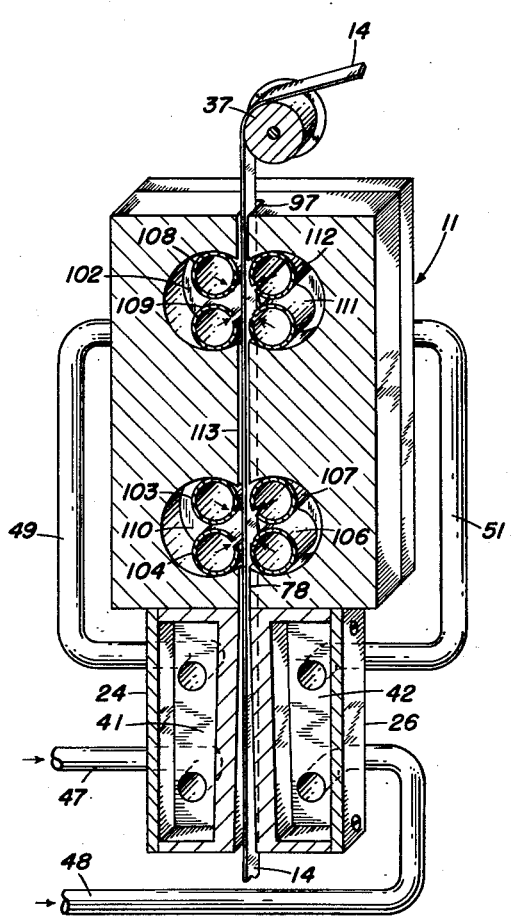

FIG. 5 is an isometric view similar to FIG. 2 of a modification of the preferred embodiment shown in FIG. 1 with this view showing that portion of the modified device to one side of a plane passed through the modified device in a position similar to the position of plane 2—2 of FIG. 1; and FIG. 6 is an isometric view similar to FIG. 2 of a second modification of the preferred embodiment shown in FIG. 1 with this view showing that portion of the modified device to one side of a plane passed through the modified device in a position similar to the position of plane 2—2 of FIG. 1.

Referring now to the drawings, wherein like reference characters designate like or corresponding parts throughout the several views, there is shown in FIGS. 1, 2 and 3 (which illustrate a preferred embodiment) the squeegee-air dryer 11 having a housing preferably constructed of metal and formed in two halves comprising housing components 12, 13 which are shown in separated position. A knob and linkage 52 is used to slide component 13 along dovetailed track 53 for separating the two halves. In this position of housing components 12 and 13 film strip 14 can be quickly and easily inserted between offset squeegee or wiper rollers 16, 17 in wiping chamber 18 and between rotatably adjustable air tubes 19, 21 in drying chamber 22 avoiding thereby the necessity of threading the film 14 through the device. Although the present discourse is direction toward the cleaning of film it is to be understood that the operation would be similar in the cleaning of magnetic tape or in the processing of a continuous web of any material. Squeegee rollers 16, 17 are driven by the film 14 and turn freely to prevent any rubbing action between the film and the roller surfaces. As shown rollers 16 and 17 are offset vertically and so arranged horizontally that film 14 has sufficient contact area or wrap-around on both rollers to provide both a good wiping action and a positive drive action causing the free-rolling rollers to rotate by the film 14. To provide a cushion for changes in stress on film 14, roller 17 is biased outwardly by spring 23 allowing for movement of roller 17 away from roller 16 to decrease the strain on film 14 during the starting and stopping thereof but still maintaining continuous contact between the rollers 16, 17 and film 14 assuring effective operation. To decrease the chances of abrading or scratching the film the surfaces of rollers 16, 17 are made of a smooth, durable plastic such as Teflon. The rollers 16, 17 are located in the throat of the squeegee-air dryer 11 in order that when so positioned they will remove all excess solvent from film 14 while this solvent remains in the liquid state before the film is exposed to any turbulence from the air squeegee. Thereupon this solvent runs down the film or down the sides of the splash shield assembly parts 24, 26 into cleaning tank 27. In order to further facilitate runoff to tank 27 the bottom edges of splash shield assembly parts 24, 26 are cut on a bias so that the returning solvent running down the sides of splash shield assembly parts 24, 26 collects at the low point, dropping from there into tank 27 directly below.

Film 14 having had the greater portion of the solvent removed therefrom by rollers 16, 17 passes upwardly into drying chamber 22. Film 14 has at this point a very small amount of solvent thereon in a thin layer on its surfaces and passes between opposing sheetlike air jets 28, 29 which proceed outwardly from air tubes 19, 21 through thin slits 31, 32. Air jets 28, 29 apply an even fine flow of accurately directed air to each side of film 14 striking opposite sides of the film at the same station instantly lifting from the surfaces of film 14 the thin layer of solvent remaining thereon in very small droplets mixed with the air. The air jets 28, 29 consist of warm, low pressure air commonly available in most laboratories. In passing from wiping chamber 18 to drying chamber 22 and from drying chamber 22 out of air dryer 11 the path of film 14 is guided to permit unimpeded passage through openings of close tolerance. Thus, film 14 is pulled through the cleaning apparatus by take-up reel 33, the film proceeding from supply reel 34 through the deep, narrow ultrasonic cleaning tank 27, up between splash shield assembly parts 24, 26, through throat 36 to rollers 16, 17. From this point rollers 16, 17 and guide roller 37 direct the path of film 14 into and out of drying chamber 22 through narrow inlet port 38 and narrow exit port 39. The width of throat 36, inlet port 38 and exit port 39 are determined by the minimum clearance required for scratch-free passage for film 14 (and splices thereto) when travelling through the system at speeds of about 120 ft./min. In the design, by keeping these widths down to the minimum the rate at which air can escape from drying chamber 22 is reduced to the point at which the pressure in drying chamber 22 is maintained at slightly over atmospheric. For this reason, the rate of evaporation of solvent directly from the surfaces of film 14 is decreased and air jets 28, 29 gently but forcibly remove the solvent from film 14 in small fine droplets still in the liquid state. Some of the air ejected from slits 31, 32 with droplets of solvent suspended therein is forced downwardly through inlet port 38, wiping chamber 18, throat 36 and between parts 24, 26 of the splash shield assembly. To prevent the condensation of water vapor from out of this downwardly directed drying air or from the atmosphere upon the surfaces of parts 24, 26, heat exchanger compartments 41, 42 are provided integral with parts 24, 26 of the splash shield assembly. Warm air (about 80° F.) is constantly circulated through the heat exchanger compartments to maintain the surfaces of parts 24, 26 warm enough (above the dew point) to prevent condensation of water vapor on these surfaces. Thus, the air from low pressure air supply 43 passes through conduit 44 to heater 46 and thence through pipes 47, 48 to heat exchanger compartments 41, 42. After circulating in the heat exchangers the warm air is forced out through pipes 49, 51 from whence the air passes freely to air tubes 19, 21 for ejection from slits 31, 32.

That portion of the air in drying chamber 22 which escapes through exit port 39 provides an air cushion on each side of film 14 as it moves out of the device as an added protection against scratching.

End-slotted stub shafts 54, 56 affixed to air tubes 19, 21 are used to rotatably adjust air supply tubes 19, 21 to direct the air jets 28, 29, at the optimum angle to film 14.

This embodiment provides a compact integrated squeegee and dryer which because of its small size can be conveniently installed close to the surface of the cleaning tank thereby giving maximum economy by reducing the evaporation of the cleaning solvent. Also the same air is used both to maintain the heat-exchanger at a warm temperature to eliminate the formation of condensation and also to dry the film or tape.

Instead of employing two air tubes the arrangement shown in FIG. 4 may be used utilizing four air tubes 61, 62, 63, 64 in the drying chamber 22. In such a configuration the slots 66, 67, 68, 69 are oriented as shown to eject air jets in opposing pairs. Of course, rollers 16, 17 may, if desired, be placed with their axes in the same horizontal plane and in line contact with film 14 on opposite sides thereof but the present arrangement is preferred.

In FIG. 5 is shown a modification in which additional air jets are employed in place of wiper rollers 16, 17. Thus, film 14 passes upwardly through squeegee-air dryer 11 into lower air chamber 70 in which are arranged air tubes 71, 72 ejecting air jets 73, 74 outwardly from slits 76, 77 in the direction of film travel and impinging on opposite sides of film 14.

In this manner what may be called an "air wall" is created beyond which the greater portion of the solvent on film 14 will not pass. The solvent so retained from proceeding with film 14 will for the most part run back down the film strip to the cleaning tank (not shown). By directing the air jets upwardly as shown a minimum of turbulent air is allowed to escape downwardly through throat 78 and as a result the solvent in the tank below remains undisturbed. Above the lower air chamber 70 is located central air chamber 79 containing a single air tube 81 having slits 82, 83 diametrically arranged in the upper and lower portions of air tube 81. Air tube 81 is so oriented that film 14 passes unimpeded upwardly through slits 82, 83 and air is discharged from both slits 82 and 83 supplying a cushion on each side of film 14. Upper air chamber 86 contains air tubes 87, 88 having slits 89, 91. Air jets 92, 93 are directed opposite the direction of film travel and serve as an "air wall" beyond which that solvent which by-passed the lower air chamber 70 is not allowed to pass. Communication between lower air chamber 70, central air chamber 79, upper air chamber 86 and the atmosphere is effected by narrow ports 94, 96, 97, said ports being wide enough to accommodate the unimpeded passage of film 14 (and splices thereto). As in the preferred embodiment the splash shield assembly parts 24, 26 with integral heat exchanger compartments 41, 42 are also employed. Air jets 73, 74 by forming the lower "air wall" and air jets 92, 93 by forming the upper "air wall" actually localize the zone of turbulence thereby minimizing the turbulence which occurs between splash shield assembly parts 24, 26. This in turn reduces the vaporization of cleaning solvent running down film 14 and the surfaces of splash shield assembly parts 24, 26 as it returns to the cleaning tank (not shown) below. Though not shown in FIG. 5 the device is used in connection with air supply 43, conduit 44, and heater 46, for supplying warm air to pipes 47 and 48. After leaving the heat exchanger the warm air is fed from pipes 49, 51 through manifolds (not shown) in the back of the dryer to air jets 73, 74, 82, 83, 92 and 93.

A second alternate construction is illustrated in FIG. 6. This modification differs from that shown in FIG. 5 in that the central air chamber is not employed and both the lower air chamber 101 and the upper air chamber 102 contain four air tubes instead of two air tubes. The arrangement of air tubes 103, 104, 106, 107 in lower air chamber 101 and of air tubes 108, 109, 111, 112 in upper air chamber 102 is similar to the arrangement shown in FIG. 4. Port 113 serves to provide communication between lower air chamber 101 and upper air chamber 102. In all other respects the operation of this modification is the same as for the device in FIG. 5.

Obviously many modifications and variations of the present invention are possible in the light of the above teachings. It is therefore to be understood that within the scope of the appended claims the invention may be practiced otherwise than as specifically described.

What is claimed is:

1. An integrated squeegee-air dryer comprising a closed housing having an inlet and an exit thereto, first means located within said housing adjacent said inlet for wiping liquid from the surfaces of a web of material being drawn through said housing, second means formed integral with said inlet for maintaining those surfaces surrounding said inlet at a temperature above the dew point and third means mounted in said housing adjacent said exit for directing warm air simultaneously against opposite surfaces of said web material whereby a minimum amount of turbulence is created within said housing.

2. An integrated squeegee-air dryer as described in claim 1 wherein the first means comprises a chamber having means for access thereto and means of egress therefrom, a pair of opposing freely rotatable rollers mounted within said chamber, one roller being mounted to either side of the web.

3. An integrated squeegee-air dryer as described in claim 1 wherein the second means comprises a plurality of heating compartments and pipes for conducting warm air to and from said heating compartments.

4. An integrated squeegee-air dryer as described in claim 1 wherein the third means comprises a chamber having means for access thereto and means of egress therefrom, a pair of rotatably adjustable air tubes mounted within said chamber with their axes substantially parallel and one tube positioned to either side of the web, each of said tubes having an opening through the wall thereof from which is forced a jet of warm air under pressure.

5. An integrated squeegee-air dryer comprising a closed housing having an inlet and an exit thereto, a plurality of chambers within said housing communicating with said inlet and exit, means for communication between said chambers, said means of communication being aligned with said inlet and exit to provide a direct path through said housing for the unimpeded drawing therethrough of a web of material to be dried, one of said chambers being located adjacent said inlet and having mounted therein wiping means for removing liquid from the surfaces of said web, a second of said chambers being located adjacent said exit and having mounted therein drying means for blowing from the surface of said web any liquid remaining thereon and means formed integral with said inlet for preventing the condensation of water vapor by maintaining at a temperature above the dew point those surfaces of said housing adjacent said inlet.

6. An integrated squeegee-air dryer as described in claim 5 wherein the wiping means comprises a pair of opposing freely rotatable rollers, one roller to either side of the web, said rollers being sufficiently displaced vertically and horizontally that said web shall wrap part of the way around the circumference of each roller whereby said rollers are driven as said web is drawn through the housing.

7. An integrated squeegee-air dryer as described in claim 5 wherein one roller shall be resiliently mounted so as to maintain both rollers in constant contact with the web.

8. An integrated squeegee-air dryer as described in claim 7 wherein the drying means comprises a pair of rotatably adjustable air tubes mounted with their axes substantially parallel and one tube positioned to either side of the web, each of said air tubes having an opening through the wall thereof from which is forced a jet of warm air under pressure, said jets proceeding in the general direction of travel of said web and simultaneously impinging on opposite faces of said web at the same station.

9. An integrated squeegee-air dryer as described in claim 7 in which the drying means comprise two pair of rotatably adjustable air tubes, all tubes being mounted with their axes substantially parallel and one tube from each pair of tubes being positioned to either side of the web, one pair of tubes being mounted opposite a first station along the path of the web, the other pair of tubes being mounted opposite a second station along the path of the web, said second station being spaced from and located below said first station, each of said tubes having an opening through the wall thereof from which is ejected a jet of warm air under pressure, the jets of air from said one pair of tubes simultaneously impinging on the opposite faces of said web at a third station and being directed opposite the general direction of travel of said web, the jets of air from said other pair of tubes simultaneously impinging on the opposite faces of said web at a fourth station and being directed in the general direction of travel of said web, said third and fourth stations being located between said first and second stations and said third station being spaced from and located above said fourth station.

10. An integrated squeegee-air dryer as described in claim 5 wherein the drying means comprises a pair of air tubes, each tube having a slit through the wall thereof from which slits are emitted opposing air jets directed to each side of the web, said jets being directed in the general direction of travel of said web and creating thereby an "air wall" to strip from said web the greater portion of liquid on the surface thereof.

11. An integrated squeegee-air dryer comprising a housing enclosing a plurality of chambers through which a web of material to be dried is adapted to pass, means forming an entrance and an exit in opposite walls of said housing, said chambers communicating with each other through ports and with said entrance and exit, each of said ports being restricted in size whereby the width and length thereof are substantially equal to the width and thickness respectively of the web passing therethrough, said entrance, ports and exit being substantially in alignment, one of said chambers located adjacent said entrance, a pair of freely rotatable rollers mounted in said one chamber with their axes in parallel relationship vertically offset from each other and horizontally spaced a distance less than the sum of the radii of said rollers, said web passing between said rollers and being in constant "wrap-around" contact with each of said rollers to cause said rollers to rotate during operation, a second of said chambers located adjacent said exit, a pair of rotatably adjustable air tubes mounted in said second chamber with their axes substantially parallel and one tube positioned to either side of said web, each of said air tubes having a slit through the wall thereof from which is ejected warm air under pressure, the jets of air simultaneously impinging on the opposite faces of said web at the same station and being directed in the general direction of travel of said web through said housing and means formed integral with the surfaces of said housing adjacent said entrance, said means preventing the condensation of water vapor by maintaining said housing surfaces at a temperature above the dew point.

12. An integrated squeegee-air dryer as described in claim 11 in which the housing is formed in two parts, the plane of separation between said parts passing through the ports, the entrance and the exit and means by which said parts may be separated and retracted to closed to permit easy access to the interior of the chambers in said housing.

References Cited in the file of this patent

UNITED STATES PATENTS

| | | |
|---|---|---|
| 1,299,266 | Thompson | Apr. 1, 1919 |
| 2,648,089 | Mayer | Aug. 11, 1953 |
| 2,718,065 | Conti | Sept. 20, 1955 |
| 2,882,611 | Debrie | Apr. 21, 1959 |
| 2,906,205 | Speers | Sept. 29, 1959 |

UNITED STATES PATENT OFFICE
CERTIFICATION OF CORRECTION

Patent No. 3,009,257                 November 21, 1961

Kenneth W. Scott

It is hereby certified that error appears in the above numbered patent requiring correction and that the said Letters Patent should read as corrected below.

Column 8, line 12, after "closed" insert -- position --.

Signed and sealed this 17th day of April 1962.

(SEAL)
Attest:

ESTON G. JOHNSON
Attesting Officer

DAVID L. LADD
Commissioner of Patents